US010711822B2

(12) United States Patent
Lee et al.

(10) Patent No.: US 10,711,822 B2
(45) Date of Patent: Jul. 14, 2020

(54) NUT INTEGRATED WITH BRACKET AND METHOD OF MANUFACTURING THE SAME

(71) Applicants: HYUNDAI MOTOR COMPANY, Seoul (KR); KIA MOTORS CORPORATION, Seoul (KR); PROTECH KOREA CO. LTD., Gwangju (KR); SUNGWOO HITECH CO., LTD., Busan (KR)

(72) Inventors: Heui Bom Lee, Suwon-si (KR); Dongjin Lee, Anyang-si (KR); Juncheul Jung, Suwon-si (KR); Jeong Rok Yun, Gwangju (KR); Mun Yong Lee, Busan (KR); Sin Ho Ryu, Gwangju (KR); Sang Lae Lee, Ulsan (KR)

(73) Assignees: HYUNDAI MOTOR COMPANY, Seoul (KR); KIA MOTORS CORPORATION, Seoul (KR); PROTECH KOREA CO. LTD., Gwangsan-gu, Gwangiu (KR); SUNGWOO HITECH CO., LTD., Busan (KR)

( * ) Notice: Subject to any disclaimer, the term of this patent is extended or adjusted under 35 U.S.C. 154(b) by 148 days.

(21) Appl. No.: 15/684,487

(22) Filed: Aug. 23, 2017

(65) Prior Publication Data

US 2018/0163768 A1    Jun. 14, 2018

(30) Foreign Application Priority Data

Dec. 14, 2016 (KR) .......................... 10-2016-0170802

(51) Int. Cl.
*B21K 1/70* (2006.01)
*F16B 37/04* (2006.01)
*B21D 28/06* (2006.01)
*B21D 53/24* (2006.01)
*F16B 37/02* (2006.01)
(Continued)

(52) U.S. Cl.
CPC ............ *F16B 37/044* (2013.01); *B21D 28/06* (2013.01); *B21D 53/24* (2013.01); *B21K 1/66* (2013.01); *B21K 1/70* (2013.01); *F16B 37/02* (2013.01); *F16B 37/04* (2013.01); *B21H 3/08* (2013.01)

(58) Field of Classification Search
CPC ... B21K 1/46; B21K 1/56; B21K 1/64; B21K 1/66; B21K 1/70; B21D 53/24
See application file for complete search history.

(56) References Cited

U.S. PATENT DOCUMENTS 5,503,596 A * 4/1996 Nagayama ............... B21K 1/70
  470/20

FOREIGN PATENT DOCUMENTS

JP    5-64522 U    8/1993
JP    7-241624 A    9/1995
(Continued)

*Primary Examiner* — Debra M Sullivan
(74) *Attorney, Agent, or Firm* — Morgan, Lewis & Bockius LLP

(57) ABSTRACT

A method of manufacturing a nut integrated with a bracket forms the nut formed integrally with the bracket or a slab base nut by using a plate material supplied between a punch and a die. The slab base nut includes a base plate and a boss extending from the base plate and including female-threads. The base plate and the boss are integrated into a single piece without welding trace.

10 Claims, 8 Drawing Sheets

(51) Int. Cl.
 *B21K 1/66* (2006.01)
 *B21H 3/08* (2006.01)

(56) References Cited

FOREIGN PATENT DOCUMENTS

| | | |
|---|---|---|
| JP | 2008-201151 A | 9/2008 |
| KR | 30-04333860003 S | 12/2006 |
| KR | 20-2009-0005953 U | 6/2009 |
| KR | 10-1251043 B1 | 4/2013 |
| KR | 10-2015-0109917 A | 10/2015 |

* cited by examiner

NUT INTEGRATED WITH BRACKET AND METHOD OF MANUFACTURING THE SAME

CROSS-REFERENCE TO RELATED APPLICATION

This application claims priority to and the benefit of Korean Patent Application No. 10-2016-0170802 filed in the Korean Intellectual Property Office on Dec. 14, 2016, the entire contents of which are incorporated herein by reference.

BACKGROUND

(a) Field

The present disclosure relates to a nut integrated with a bracket and a method of manufacturing the same, and more particularly, to a nut integrated with a bracket, in which the bracket and the nut are integrally formed by processing a plate material supplied between a punch and a die through multiple steps, and a method of manufacturing the same.

(b) Description of the Related Art

In general, various coupling means are used for connecting portions, where components such as components for a vehicle, components of various types of industrial machines, and components of consumer electronics are connected, in order to connect or couple the components, and particularly, a mechanical coupling method, which mainly uses bolts and nuts to couple the components, is mainly used at a particular portion to which a high load or consistent impact is applied.

The disclosure of this section is to provide background of the invention. Applicant notes that this section may contain information available before this application. However, by providing this section, Applicant does not admit that any information contained in this section constitutes prior art.

SUMMARY

One aspect of the present invention provides a nut integrated with a bracket, which is formed by forming a beading portion by performing a drawing process, through multiple steps, on a plate material supplied between a punch and a die, and then forming the nut, which has an increased thickness portion at a tip thereof, integrally with the bracket through piercing, forging, and cam upsetting processes, thereby increasing rigidity at an input point of a coupling portion of a component of a suspension system of a vehicle body, and a method of manufacturing the same.

Another aspect of the present invention provides a nut integrated with a bracket, in which an increased thickness portion is formed to protrude at an outer circumference of a tip of the nut, and a protruding end is formed on a tip surface of the increased thickness portion so as to protrude in a longitudinal direction, thereby ensuring joint rigidity by ensuring a joint surface with respect to another bracket, and a method of manufacturing the same.

An embodiment of the present invention provides a method of manufacturing a nut integrated with a bracket, which forms the nut formed integrally with the bracket by using a plate material supplied between a punch and a die, the method including: a pre-drawing step S1 of forming a reference hole and a processing cross section in the plate material supplied between the punch and the die, forming a beading portion by processing the processing cross section through multiple steps, and piercing a center of the beading portion; a forging step S2 of forming a pipe portion having a tube shape by gradually widening a through hole in the beading portion and decreasing a diameter of the pipe portion from the processing cross section to a tip of the beading portion, and then processing an outer circumferential surface of the pipe portion so as to form the tube shape through multiple steps so that a thickness is increased from the tip of the pipe portion to the processing cross section, subsequent to the pre-drawing step; a precision forging step S3 of precisely correcting dimensions of an inner diameter and an outer diameter of the pipe portion formed in the tube shape, forming a shape protruding from the tip of the pipe portion, and then compressing the pipe portion in order to remove residual burrs on a surface thereof, subsequent to the forging step; and a post-processing step S4 of cutting the processing cross section to a final product shape, and then forming bent ends at both end portions of the cut processing cross section, and a threaded tap on an inner circumferential surface of the pipe portion, subsequent to the precision forging step.

The pre-drawing step S1 may include: a cutting step S11 of forming the reference hole at each edge of the supplied plate material, and simultaneously partially cutting the plate material along the edge of the plate material in order to obtain the processing cross section required to process the nut; a drawing step S12 of forming the beading portion in the processing cross section of the plate material, through multiple steps, so that a depth of the beading portion is gradually increased, an area of the beading portion is gradually decreased, and a thickness of the beading portion is gradually increased, subsequent to the cutting step; and a piercing step S13 of forming the through hole at a center of a bottom surface of the beading portion formed by the drawing step.

In the drawing step S12, the beading portion may be formed about a central portion of the processing cross section, and the beading portion may be formed to protrude downward with respect to the processing cross section.

In addition, the precision forging step S3 may include: an upsetting step S31 of precisely correcting the dimensions of the inner diameter and the outer diameter of the pipe portion by compressing the pipe portion, which is formed in the tube shape, in a longitudinal direction through multiple steps, subsequent to the forging step; a cam upsetting step S32 of forming an increased thickness portion, which protrudes at an outer circumference of a tip of the pipe portion, by compressing the inner and outer circumferential surfaces and a tip portion of the pipe portion, which have the corrected dimensions, to predetermined shapes, subsequent to the upsetting step; and a cam rest burring step S33 of removing residual burrs on a surface of the pipe portion by compressing the inner and outer circumferential surfaces and the tip portion of the pipe portion, which has the increased thickness portion, to predetermined shapes, subsequent to the cam upsetting step.

The cam upsetting step S32 may be performed by left and right cam dies which operate toward both sides, and upper and lower punches which operate upward and downward, and the cam rest burring step S33 may be performed by left and right cam dies which operate toward both sides, and an upper punch which operates upward and downward.

In addition, in the precision forging step S3, the cam upsetting step S32 may form an increased thickness portion which protrudes at an outer circumference of a tip of the pipe portion, and a protruding end which protrudes in a longitudinal direction on a tip surface of the increased thickness portion, by compressing the inner and outer circumferential surfaces and a tip portion of the pipe portion, which have the corrected dimensions, to predetermined shapes, subsequent to the upsetting step, and the cam rest burring step S33 may remove residual burrs on a surface of the pipe portion by compressing the inner and outer circumferential surfaces and the tip portion of the pipe portion, which has the increased thickness portion and the protruding end, to predetermined shapes, subsequent to the cam upsetting step.

In this case, in the cam rest burring step S33, the protruding end may protrude in the longitudinal direction of the pipe portion so as to have a cylindrical shape having a predetermined thickness and an inner circumferential surface having an inner diameter identical that of the pipe portion.

Further, the post-processing step S4 may include: a blanking step S41 of cutting the processing cross section along an effective shape to be formed as a final product, subsequent to the cam rest burring step; a flanging step S42 of forming a final product-shaped bracket having the bent ends formed by bending both end portions of the effective processing cross section, which is formed integrally with the pipe portion, to predetermined shapes, subsequent to the blanking step; and a tapping step S43 of forming the nut by processing the threaded tap on the inner circumferential surface of the pipe portion, subsequent to the flanging step.

In the flanging step S42, the effective processing cross section may have a rectangular shape having the pipe portion formed at a center thereof, and in the flanging step S42, the bent ends may be formed by bending both end portions of the bracket, which have a long length, at an angle of 90° at a predetermined radius of curvature toward the pipe portion.

Another embodiment of the present invention provides a nut integrated with a bracket, in which the nut, which has a threaded tap processed on an inner circumferential surface of a pipe portion and is formed integrally with an increased thickness portion that protrudes at an outer circumference of a tip of the pipe portion, is formed integrally with the bracket, by the method of manufacturing the nut integrated with the bracket.

Here, the pipe portion may be formed at a center of the rectangular bracket, the bracket may be formed by forming bent ends at both end portions of the bracket, and the bent ends may be formed by bending both end portions of the bracket, which have a long length, at an angle of 90° at a predetermined radius of curvature toward the pipe portion.

Yet another embodiment of the present invention provides a nut integrated with a bracket, in which the nut, which has a thread processed on an inner circumferential surface of a pipe portion and is formed integrally with an increased thickness portion that protrudes at an outer circumference of a tip of the pipe portion and a protruding end that protrudes in a longitudinal direction on a tip surface of the increased thickness portion, is formed integrally with the bracket, by the method of manufacturing the nut integrated with the bracket.

Here, the pipe portion may be formed at a center of the rectangular bracket, the bracket may be formed by forming bent ends at both end portions of the bracket, and the bent ends may be formed by bending both end portions of the bracket, which have a long length, at an angle of 90° at a predetermined radius of curvature toward the pipe portion.

An embodiment of the present invention provides the nut integrated with the bracket, which is formed by forming the beading portion by performing the drawing process, through multiple steps, on the plate material supplied between the punch and the die, and then forming the nut, which has the increased thickness portion at the tip thereof, integrally with the bracket through the piercing, forging, and cam upsetting processes, such that the nut integrated with the bracket may be applied to a coupling portion of a component of a vehicle body, and particularly, may be applied to a component of a suspension system of the vehicle body, thereby increasing rigidity at an input point.

In addition, an embodiment of the present invention provides the nut integrated with the bracket having the increased thickness portion which protrudes at the outer circumference of the tip of the nut, and the protruding end which protrudes in the longitudinal direction on the tip surface of the increased thickness portion, such that the nut integrated with the bracket is applied to a coupling portion of a component of the vehicle body, and joined to another bracket in a state in which the protruding end is fitted with another bracket, thereby ensuring joint rigidity.

In addition, it is possible to easily form the increased thickness portion, which has an undercut shape in a forming direction, on the tip of the nut by using the left and right cam dies and the upper and lower punches.

DETAILED DESCRIPTION OF THE EMBODIMENTS

Figure 1:
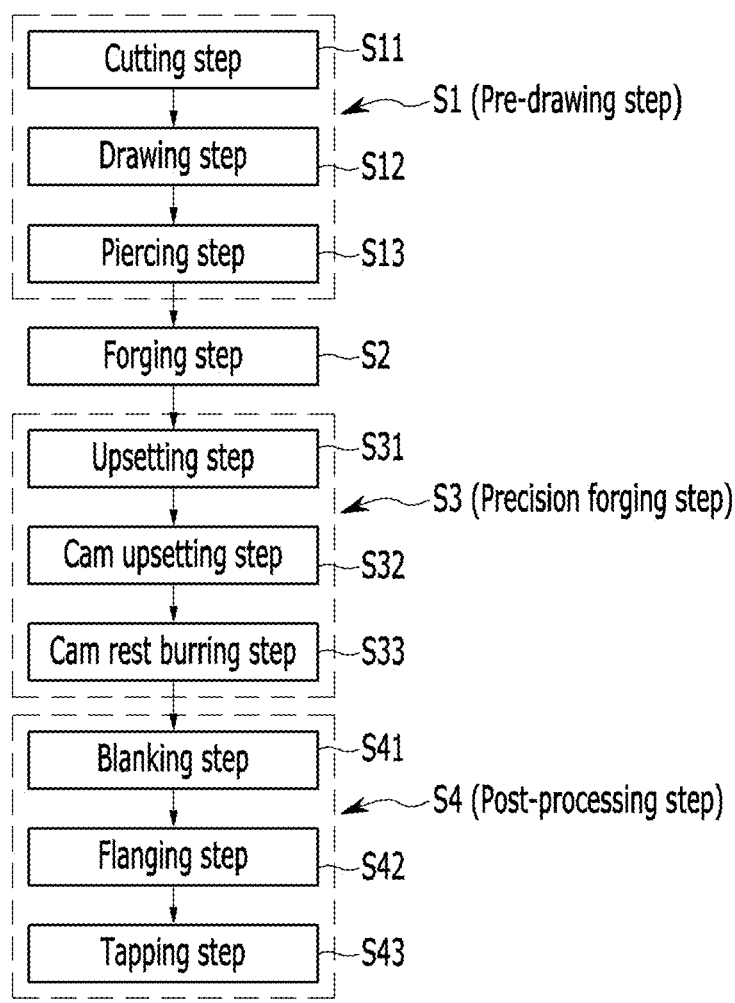
FIG. 1 is a process block diagram for each step according to a method of manufacturing a nut integrated with a bracket according to an embodiment of the present invention.

Hereinafter, embodiments of the present invention will be described in detail with reference to the accompanying drawings.

The size and thickness of each component illustrated in the drawings are arbitrarily shown for understanding and ease of description, but the present invention is not limited thereto. Thicknesses of several portions and regions are enlarged for clearly describing the above.

In addition, parts irrelevant to the description will be omitted to clearly describe the embodiments of the present invention.

A typical mechanical coupling method may include a mounting structure implemented in a weld nut manner in which a weld nut is provided on one component, and the other component is fastened to the weld nut by a bolt.

However, because the weld nut is fixed to one component by welding, a welding portion, which is applied to the mechanical coupling portion, may have a problem with durability which is caused by a welding defect or corrosion, and particularly, in a case in which the welding portion is applied to components of a suspension system of a vehicle body for a vehicle, the welding portion becomes an input point to which an external load is inputted, which may cause various problems due to a lack of rigidity at the input point.

Therefore, there is a need for developments on a nut integrated with a bracket, in which the bracket and the nut are integrally formed so as to be applied to components of the suspension system of the vehicle body which requires high rigidity at an input point, or components of the vehicle body which is difficult to apply the weld nut in the related art.

Figure 2:
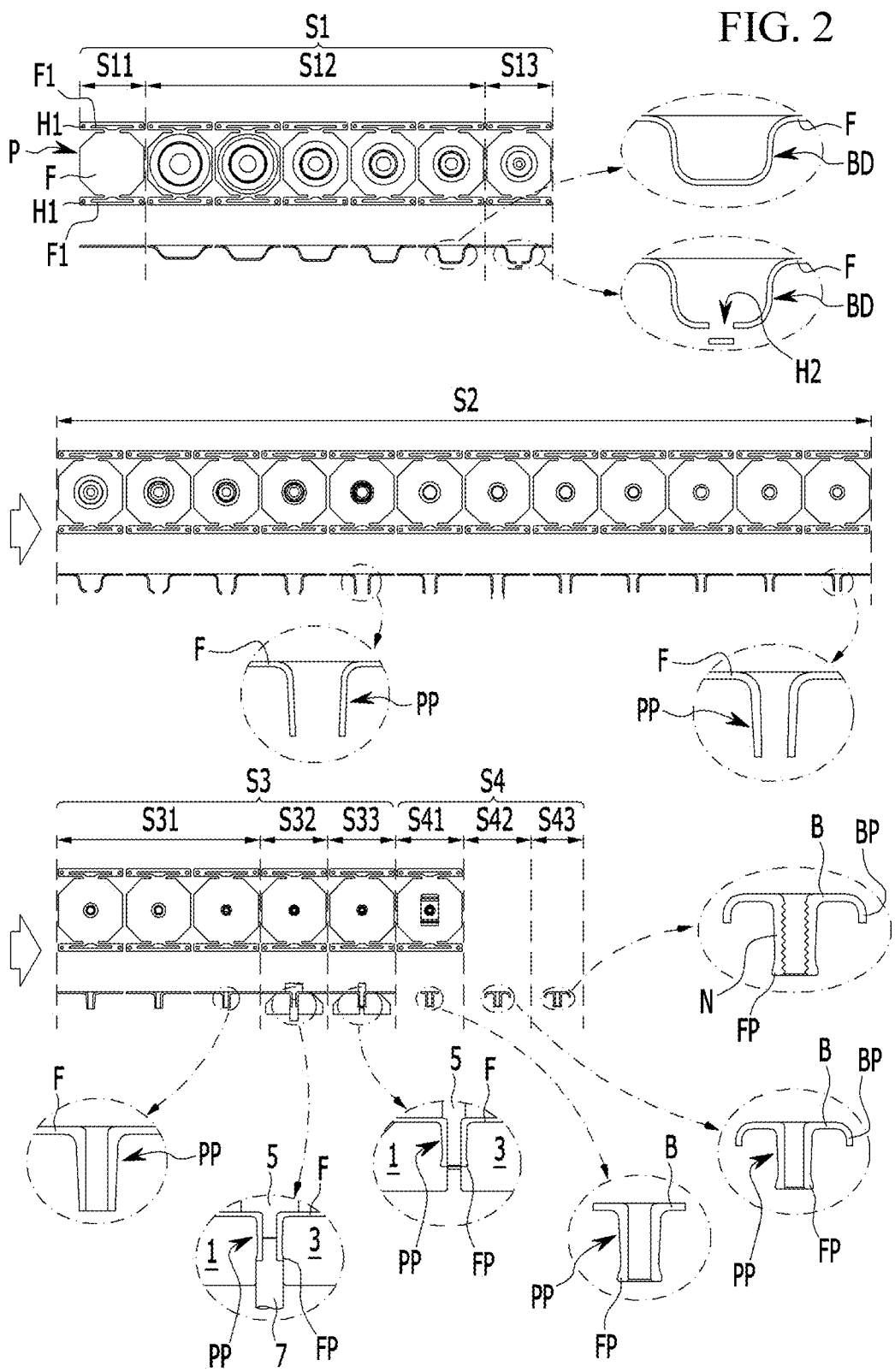
FIG. 2 is a process diagram for each step according to the method of manufacturing the nut integrated with the bracket according to an embodiment of the present invention.

FIG. 1 is a process block diagram for each step according to a method of manufacturing a nut integrated with a bracket according to an embodiment of the present invention, and FIG. 2 is a process diagram for each step according to the method of manufacturing the nut integrated with the bracket according to an embodiment of the present invention.

Referring to FIGS. 1 and 2, a method of manufacturing a nut integrated with a bracket according to an embodiment of the present invention forms the nut integrated with the bracket according to an example, in which a bracket B and a nut N are integrally formed, by using a plate material P supplied between a punch and a die through an overall twenty-four-step process.

The method of manufacturing the nut integrated with the bracket according to an example includes a pre-drawing step S1 which includes a cutting step S11, a drawing step S12, and a piercing step S13, a forging step S2, a precision forging step S3 which includes an upsetting step S31, a cam upsetting step S32, and a cam rest burring step S33, and a post-processing step S4 which includes a blanking step S41, a flanging step S42, and a tapping step S43.

First, the pre-drawing step S1 includes a process of forming reference holes H1 and processing cross section or to-be-processed portion F in the plate material P supplied between the punch and the die, a process of forming beading portions BD by processing the processing cross section F through multiple steps, and a process of piercing a center of the beading portion BD.

In embodiments, the cutting step S11 forms the circular reference holes H1 at each edge of the supplied plate material P by using the punch and the die, and simultaneously partially cuts the plate material P along the edge of the plate material P in order to obtain the processing cross section F required to process the nut.

In this case, the processing cross section F entirely defines an octagonal contour, and reference surfaces F1, which have the reference holes H1, are connected to both sides of the processing cross section F, respectively.

Further, the drawing step S12 is performed subsequent to the cutting step S11, and includes a five-step process using the punch and the die.

The drawing step S12 forms the beading portion BD in the processing cross section F of the plate material P so that a depth of the beading portion BD is gradually increased, an area of the beading portion BD is gradually decreased, and a thickness of the beading portion BD is gradually increased.

In this case, the beading portion BD is formed about a central portion of the processing cross section F, and formed to protrude downward with respect to the processing cross section F.

In addition, the piercing step S13 includes a single-step process of forming, by using the punch and the die, a through hole H2 at a center of a bottom surface of the beading portion BD formed by the drawing step S12.

Further, the forging step S2 is performed subsequent to the piercing step S13, and includes a twelve-step process using the punch and the die.

The first to fifth steps of the forging step S2 form a pipe portion PP having a tube shape by gradually widening the through hole H2 in the beading portion BD and decreasing a diameter of the pipe portion PP from the processing cross section F to a tip of the beading portion BD. Thereafter, the sixth to twelfth steps of the forging step S2 process an outer circumferential surface of the pipe portion PP so as to form the tube shape through multiple steps so that a thickness is increased from the tip of the pipe portion PP to the processing cross section F.

Further, the precision forging step S3 is performed subsequent to the forging step S2, and includes a process of precisely correcting dimensions of an inner diameter and an outer diameter of the pipe portion PP formed in the tube shape, forming a shape protruding from the tip of the pipe portion PP, and then compressing the pipe portion PP in order to remove residual burrs on a surface thereof.

In embodiments, the upsetting step S31 compresses the pipe portion PP, which is formed in a tube shape by the forging step S2, in a longitudinal direction by using the punch and the die through a three-step process, thereby precisely correcting the dimensions of the inner diameter and the outer diameter of the pipe portion PP.

In addition, the cam upsetting step S32 compresses, through a single-step process, the inner and outer circumferential surfaces and the tip portion of the pipe portion PP of which the dimensions are corrected by the upsetting step S31, to predetermined shapes, thereby forming an increased thickness portion FP that protrudes at an outer circumference of the tip of the pipe portion PP.

The cam upsetting step S32 is performed by left and right cam dies 1 and 3 which operate toward both sides, and upper and lower punches 5 and 7 which operate upward and downward.

Here, the increased thickness portion FP is formed to protrude at the outer circumference of the tip of the pipe portion PP in a radial direction so that a thickness of the tip of the pipe portion PP is increased.

In addition, the cam rest burring step S33 compresses the inner and outer circumferential surfaces and the tip portion of the pipe portion PP, which has the increased thickness portion FP formed by the cam upsetting step S32, to predetermined shapes through a single-step process, thereby removing residual burrs on the surface of the pipe portion PP.

The cam rest burring step S33 is performed by the left and right cam dies 1 and 3 which operate toward both sides, and the upper punch 5 which operates upward and downward.

Further, the post-processing step S4 is performed subsequent to the precision forging step S3, and includes a process of cutting the processing cross section F to a final product shape, and then forming bent ends BP at both end portions of the cut processing cross section F, and a threaded tap on the inner circumferential surface of the pipe portion PP.

In embodiments, the blanking step S41 cuts the processing cross section F including the pipe portion PP formed by the cam rest burring step S33, along an effective shape to be formed as a final product, through a single-step process using a trimming die.

In this case, the processing cross section F, which is cut together with the pipe portion PP, is formed as the bracket B in subsequent processes.

In addition, the flanging step S42 forms a final product-shaped bracket B having the bent ends BP formed by bending both end portions of the effective processing cross section F, which is formed integrally with the pipe portion PP by the blanking step S41, to predetermined shapes.

In this case, the effective processing cross section F has a rectangular shape having the pipe portion PP formed at a center thereof, and in the flanging step S42, the bent ends BP are formed by bending both end portions of the bracket B, which have a long length, at an angle of 90° at a predetermined radius of curvature toward the pipe portion PP.

The flanging step S42 is performed through a single-step process using a bending die.

Further, the tapping step S43, which is finally performed, forms the nut N by processing the threaded tap on the inner circumferential surface of the pipe portion PP by using a tapping mechanism.

Figure 3:
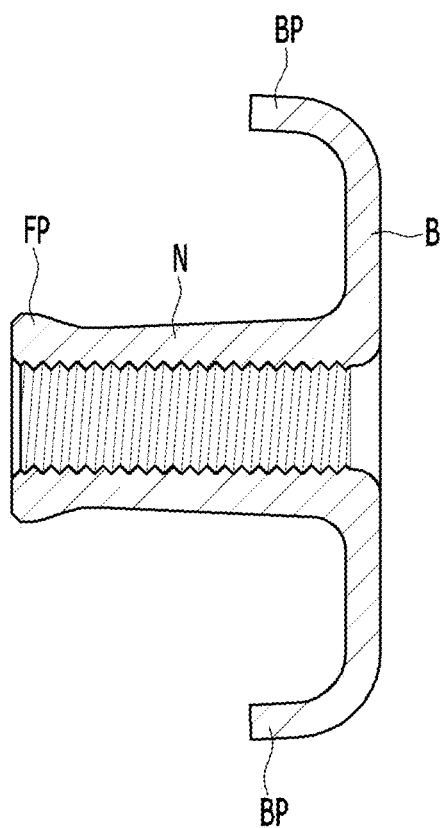
FIG. 3 is a cross-sectional view of the nut integrated with the bracket according to an embodiment of the present invention.
Figure 4:
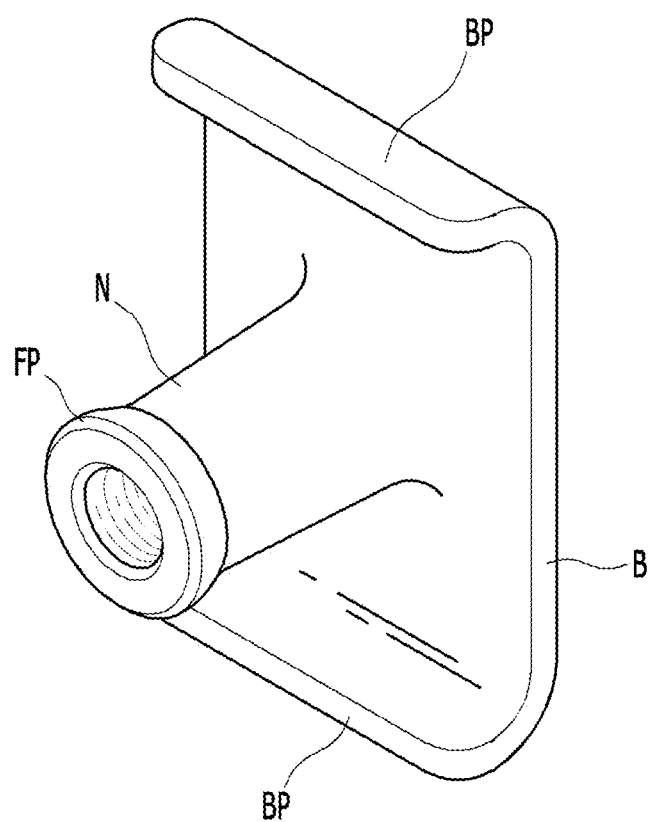
FIG. 4 is a perspective view of the nut integrated with the bracket according to an embodiment of the present invention.

FIG. 3 is a cross-sectional view of the nut integrated with the bracket according to an embodiment of the present invention, and FIG. 4 is a perspective view of the nut integrated with the bracket according to an embodiment of the present invention.

Therefore, with the aforementioned method of manufacturing the nut integrated with the bracket according to one example, the nut integrated with the bracket according to one example may be manufactured, as illustrated in FIGS. 3 and 4.

In the nut integrated with the bracket according to embodiments of the present invention, the threaded tap is processed on the inner circumferential surface of the pipe portion PP, the nut N is formed integrally with the increased thickness portion FP that protrudes at the outer circumference of the tip, and the nut N is integrally formed at the center of the bracket B having the bent ends BP at both end portions thereof.

Here, the pipe portion PP is formed at the center of the rectangular bracket B, and the bent ends BP are formed at both end portions of the bracket B by bending both end portions of the bracket B, which have a long length, at an angle of 90° at a predetermined radius of curvature toward the pipe portion PP.

Figure 5:
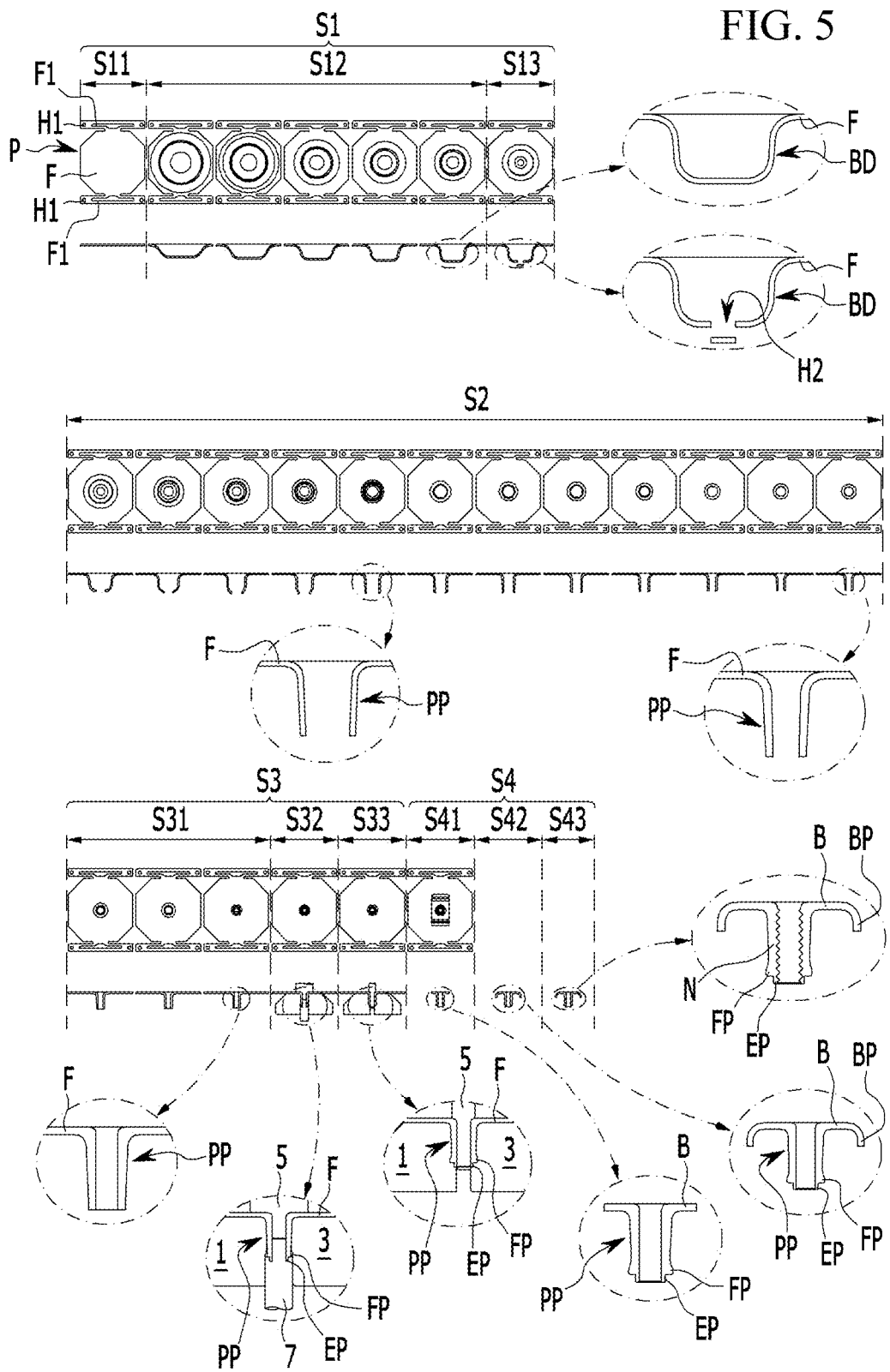
FIG. 5 is a process diagram for each step according to a method of manufacturing a nut integrated with a bracket according to an embodiment of the present invention.

FIG. 5 is a process diagram for each step according to a method of manufacturing a nut integrated with a bracket according to an embodiment of the present invention.

Meanwhile, FIG. 5 relates to the nut integrated with the bracket according to another example, and a method of manufacturing the nut integrated with the bracket according to an embodiment of the present invention includes the same process including the pre-drawing step S1 which includes the cutting step S11, the drawing step S12, and the piercing step S13, the forging step S2, the precision forging step S3 which includes the upsetting step S31, the cam upsetting step S32, and the cam rest burring step S33, and the post-processing step S4 which includes the blanking step S41, the flanging step S42, and the tapping step S43.

However, there is a difference in that the method of manufacturing the nut integrated with the bracket according to one example only forms the increased thickness portion FP, which protrudes at the outer circumference of the tip of the pipe portion PP, by compressing the inner and outer circumferential surfaces and the tip portion of the pipe portion PP, which have the corrected dimensions, to the predetermined shapes through a single-step process in the cam upsetting step S32, but in contrast, the method of manufacturing the nut integrated with the bracket according to another example forms a protruding end EP, which protrudes in a longitudinal direction on a tip surface of the increased thickness portion FP, as well as the increased thickness portion FP which protrudes at the outer circumference of the tip of the pipe portion PP, by compressing the inner and outer circumferential surfaces and the tip portion of the pipe portion PP, which have the corrected dimensions, to the predetermined shapes in the cam upsetting step S32.

Therefore, the cam rest burring step S33, which is performed subsequent to the cam upsetting step S32, compresses the inner and outer circumferential surfaces and the tip portion of the pipe portion PP, which has the increased thickness portion FP and the protruding end EP, to predetermined shapes, thereby removing residual burrs on the surface of the pipe portion PP.

Figure 6:
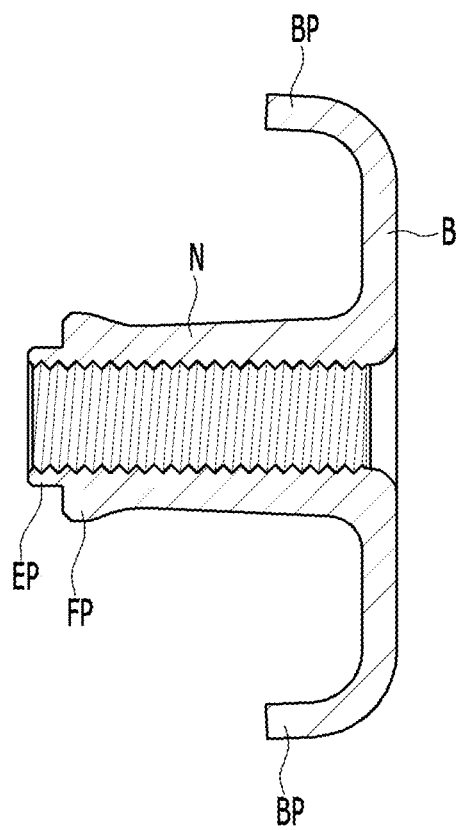
FIG. 6 is a cross-sectional view of the nut integrated with the bracket according to an embodiment of the present invention.
Figure 7:
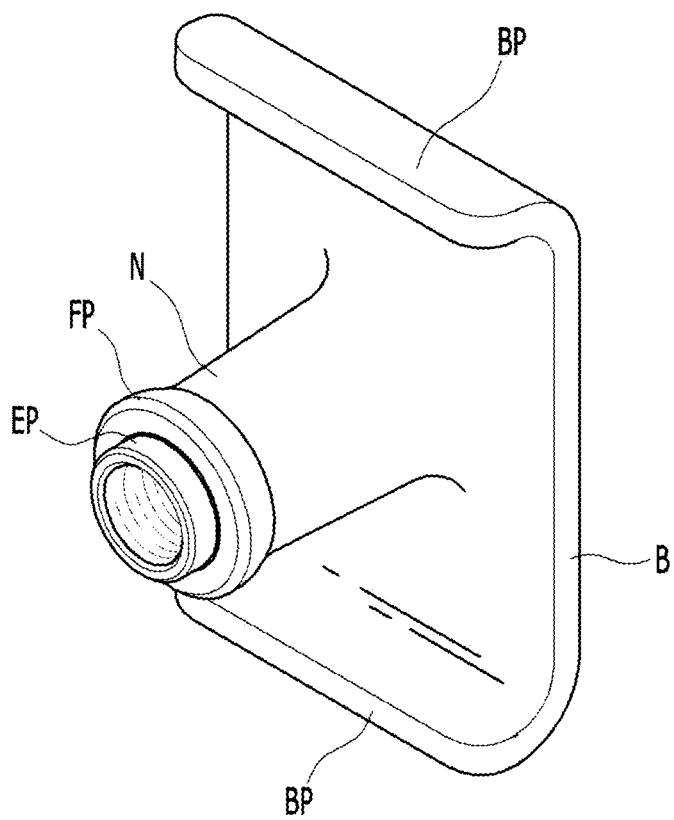
FIG. 7 is a perspective view of the nut integrated with the bracket according to an embodiment of the present invention.

FIG. 6 is a cross-sectional view of the nut integrated with the bracket according to an embodiment of the present invention, and FIG. 7 is a perspective view of the nut integrated with the bracket according to another example according to an embodiment of the present invention.

Therefore, with the aforementioned method of manufacturing the nut integrated with the bracket according to another example, the nut integrated with the bracket according to another example may be manufactured, as illustrated in FIGS. 6 and 7.

In the nut integrated with the bracket according to embodiments of the present invention, the thread is processed on the inner circumferential surface of the pipe portion PP, the nut N is formed integrally with the increased thickness portion FP which protrudes at the outer circumference of the tip, and the protruding end EP which protrudes in the longitudinal direction on the tip surface of the increased thickness portion FP, and the nut N is integrally formed at the center of the bracket B having the bent ends BP at both end portions thereof.

Here, the pipe portion PP is formed at the center of the rectangular bracket B, and the bent ends BP are formed at both end portions of the bracket B by bending both end portions of the bracket B, which have a long length, at an angle of 90° at a predetermined radius of curvature toward the pipe portion PP.

Figure 8:
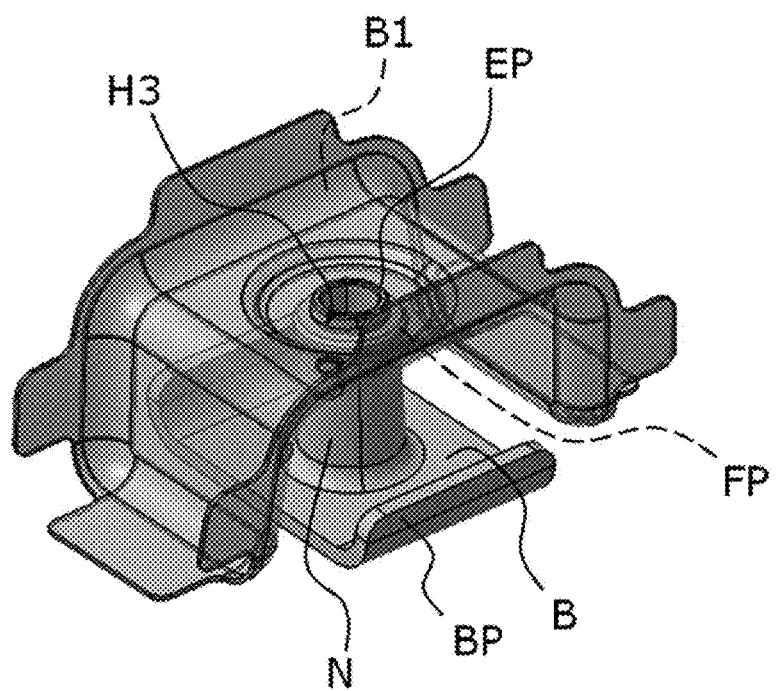
FIG. 8 is an exemplified view illustrating a state in which the nut integrated with the bracket according to an embodiment of the present invention is used.

FIG. 8 is an exemplified view illustrating a state in which the nut integrated with the bracket according to an embodiment of the present invention is used.

Referring to FIG. 8, the nut integrated with the bracket according to another example, which has the aforementioned configuration, is joined to another bracket B1 for increasing rigidity in a state in which the protruding end EP is fitted into a through hole H3 of another bracket B1, thereby ensuring joint rigidity.

Therefore, the method of manufacturing the nut integrated with the bracket according to an embodiment of the present invention may provide the nut integrated with the bracket by forming the beading portion BD first by performing the drawing process, though multiple steps, on the plate material P supplied between the punch and the die, and then forming the nut N, which has the increased thickness portion FP at the tip thereof, integrally with the bracket B through the piercing, forging, and cam upsetting processes, such that the nut integrated with the bracket may be applied to a coupling portion of a component of a vehicle body, and particularly, may be applied to a component of a suspension system of the vehicle body, thereby increasing rigidity at an input point.

In addition, the method of manufacturing the nut integrated with the bracket according to an embodiment of the present invention may provide the nut integrated with the bracket having the increased thickness portion FP which protrudes at the outer circumference of the tip of the nut N, and the protruding end EP which protrudes in the longitudinal direction on the tip surface of the increased thickness portion FP, such that the nut integrated with the bracket is applied to a coupling portion of a component of the vehicle body, and joined to another bracket B1 in a state in which the protruding end EP is fitted with another bracket B1, thereby ensuring joint rigidity.

In addition, the method of manufacturing the nut integrated with the bracket according to an embodiment of the present invention may easily form the increased thickness portion FP, which has an undercut shape in a forming direction, on the tip of the nut N by using the left and right cam dies 1 and 3 and the upper and lower punches 5 and 7.

In embodiments, referring to FIGS. 3, 4, 6 and 7, a slab base nut includes a base plate B and a hollow boss N protruding from the base plate B and functioning as a nut. The boss N has interior threads or female-threads formed on its inner wall. The boss N includes a thickened end portion or bulged end portion FP which has a thickness greater than that of an intermediate portion of the boss N. Referring to FIGS. 6 and 7, the boss N includes a tip EP with a reduced outer diameter extending from the bulged end portion.

In embodiments, the slab base nut is made by way of a stamping process using stamping press dies which include multi-stages. A metal plate is subject to blanking, drawing, piercing and forging to form the hollow boss B extending from the base plate B. During the stamping steps, the base plate B and the boss maintain their integrated state such that no welding is necessary to integrate the boss on the base plate. Thus, the slab base nut has no welding trace at places where the boss N and the base plate B are coupled.

While embodiments have been described, it is to be understood that the invention is not limited to the disclosed embodiments, but, on the contrary, is intended to cover various modifications and equivalent arrangements included within the spirit and scope of the appended claims.

What is claimed is:

1. A method of manufacturing a nut integrated with a bracket, the method comprising:
    a pre-drawing step of forming a reference hole and a processing cross section in a plate material supplied between a punch and a die, forming a beading portion by processing the processing cross section through multiple steps, and piercing a center of the beading portion to form a through hole;
    a forging step of forming a pipe portion having a tube shape by gradually widening the through hole in the beading portion and decreasing an inner diameter and an outer diameter of the pipe portion from the processing cross section to a tip of the beading portion, and then processing an outer circumferential surface of the pipe portion so as to form the tube shape through multiple steps so that a thickness is increased from the tip of the pipe portion to the processing cross section, subsequent to the pre-drawing step;
    a precision forging step of precisely correcting dimensions of the inner diameter and the outer diameter of the pipe portion formed in the tube shape, and forming a protruding end from the tip of the pipe portion, subsequent to the forging step; and
    a post-processing step of cutting the processing cross section to a final product shape, forming bent ends at both end portions of the cut processing cross section, and forming a threaded tap on an inner circumferential surface of the pipe portion, subsequent to the precision forging step,
    wherein the precision forging step includes:
        an upsetting step of precisely correcting the dimensions of the inner diameter and the outer diameter of the pipe portion by compressing the pipe portion, which is formed in the tube shape, in a longitudinal direction through multiple steps, subsequent to the forging step;
        a cam upsetting step of forming an increased thickness portion, which protrudes at an outer circumference of the tip of the pipe portion, and further forming the protruding end which protrudes in a longitudinal direction from a tip surface of the increased thickness portion, by compressing the inner and outer circumferential surfaces and a tip portion of the pipe portion, which have the corrected dimensions, to predetermined shapes, subsequent to the upsetting step; and
        a cam rest burring step of removing residual burrs on the pipe portion by compressing the inner and outer circumferential surfaces and the tip portion of the pipe portion, which has the increased thickness portion and the protruding end, to predetermined shapes, subsequent to the cam upsetting step.

2. The method of claim 1, wherein:
the pre-drawing step includes:
    a cutting step of forming the reference hole at each edge of the supplied plate material, and simultaneously partially cutting the plate material along the edge of the plate material in order to obtain the processing cross section required to process the nut;
    a drawing step of forming the beading portion in the processing cross section of the plate material, through multiple steps, so that a depth of the beading portion is gradually increased, an area of the beading portion is gradually decreased, and a thickness of the beading portion is gradually increased, subsequent to the cutting step; and
    a piercing step of forming the through hole at a center of a bottom surface of the beading portion formed by the drawing step.

3. The method of claim 2, wherein:
in the drawing step, the beading portion is formed about a central portion of the processing cross section.

4. The method of claim 3, wherein:
the beading portion is formed to protrude downward with respect to the processing cross section.

5. The method of claim 1, wherein:
the cam upsetting step is performed by left and right cam dies which operate toward both sides, and upper and lower punches which operate upward and downward.

6. The method of claim 1, wherein:
the cam rest burring step is performed by left and right cam dies which operate toward both sides, and an upper punch which operates upward and downward.

7. The method of claim 1, wherein:
in the cam rest burring step, the protruding end protrudes in the longitudinal direction of the pipe portion so as to have a cylindrical shape having a predetermined thickness and an inner circumferential surface having an inner diameter identical to that of the pipe portion.

8. The method of claim 1, wherein:

the post-processing step includes:
- a blanking step of cutting the processing cross section along an effective shape to be formed as a final product, subsequent to the cam rest burring step;
- a flanging step of forming a final product-shaped bracket having the bent ends formed by bending both end portions of the effective processing cross section, which is formed integrally with the pipe portion, to predetermined shapes, subsequent to the blanking step; and
- a tapping step of forming the nut by processing the threaded tap on the inner circumferential surface of the pipe portion, subsequent to the flanging step.

9. The method of claim 8, wherein:

in the flanging step, the effective processing cross section has a rectangular shape having the pipe portion formed at a center thereof.

10. The method of claim 8, wherein:

in the flanging step, the bent ends are formed by bending both end portions of the bracket, which have a long length, at an angle of 90° at a predetermined radius of curvature toward the pipe portion.

\* \* \* \* \*